United States Patent [19]

Thomas et al.

[11] 4,377,410

[45] Mar. 22, 1983

[54] CHROMIUM RECOVERY FROM SUPERALLOY SCRAP BY SELECTIVE CHLORINE LEACHING

[75] Inventors: John A. Thomas, Norval; David L. Jones; Victor A. Ettel, both of Mississauga, all of Canada

[73] Assignee: The United States of America as represented by the Secretary of the Interior, Washington, D.C.

[21] Appl. No.: 156,131

[22] Filed: Jun. 3, 1980

[51] Int. Cl.$^3$ .............................................. C22B 34/32
[52] U.S. Cl. ....................................... 75/112; 75/114; 75/119; 75/84; 423/48; 423/150
[58] Field of Search ................... 423/53, 40, 150, 565, 423/38; 75/84, 112, 27

[56] References Cited

U.S. PATENT DOCUMENTS

| | | | |
|---|---|---|---|
| 3,767,760 | 10/1973 | Hougen | 423/38 |
| 3,847,594 | 11/1974 | Van Der Meulen | 423/53 |
| 4,150,975 | 4/1979 | Miyake | 75/27 |
| 4,259,296 | 3/1981 | Hennion | 423/561 R |

*Primary Examiner*—Brian E. Hearn
*Attorney, Agent, or Firm*—William S. Brown; Donald A. Gardiner

[57] ABSTRACT

To recover chromium and other metals from scrap such as superalloy scrap, the scrap is sulfided to provide a molten matte which is cooled and fragmented, the fragments are leached selectively in an aqueous solution with chlorine at a controlled temperature and with agitation while controlling chlorine flow by redox potential to provide the major portion of the chromium in the leach residue and dissolving other valuable metals present as chlorides and thereafter recovering the chromium from the solid.

10 Claims, No Drawings

CHROMIUM RECOVERY FROM SUPERALLOY SCRAP BY SELECTIVE CHLORINE LEACHING

This invention resulted from work done under Contract No. J0188056 with the Bureau of Mines in Department of the Interior and is subject to the terms and provisions of the President's Patent Policy Statement of Oct. 10, 1963.

FIELD OF THE INVENTION

The present invention relates to chromium recovery from superalloy scrap by selective chlorine leaching.

BACKGROUND OF THE INVENTION

Chromium is an important constituent of a wide variety of alloys, including various steels as well as nickel-based, cobalt-based, molybdenum-based and copper-based alloys. Chromite ore from which the chrome metal is derived is found in abundance in relatively few places, notably in Southern Africa, whereas large amounts of chromium-containing scrap are generated in most industrial countries and recovery of the chromium therefrom is highly desirable. Other ores are equally available in relatively few places.

The recycling of chromium and other alloying metal containing scrap does not pose insurmountable difficulties in the case of stainless steel production. This is due in part to the ability to refine in the melting vessel as in the case of production of many complex alloys which may contain as many as five or even ten alloying elements. Such alloys are often very sensitive to contamination, and are produced by processes which do not lend themselves to any extensive refining in the melting vessel. As a result, producers of complex alloys, such as the so-called superalloys, tend to rely on pure metals for their feed, while superalloying metal-containing scrap is downgraded to produce less demanding alloys.

While procedures have been proposed in the past for separating the alloy constituents of scrap metals, none of the procedures to out knowledge has ever reached the stage of commercial implementation. This is undoubtedly ascribable to the cost and complexity of such procedures. Thus, methods of treating superalloy scrap are described in U.S. Pat. No. 3,544,309 (to A. W. Fletcher et al) as well as in the publication by P. T. Brooks et al entitled "Chemical Reclaiming of Superalloy Scrap", U.S. Dept. of Interior, Bureau of Mines, 1969. These methods are directed primarily at recovering nickel and cobalt from the scrap and entail a complete dissolution of the scrap, after which the various metals are separated by hydrometallurgical steps.

A process which avoids the slow and indiscriminate procedure of putting the whole of the scrap into solution is described in a published Japanese patent application, 73-44121 by T. Goto. The process described therein involves an initial pyrometallurgical treatment in which superalloy scrap is melted and blown with oxygen until such metals as aluminum, titanium, and silicon as well as much of the chromium content of the melt have been oxidized. Sulfur is then added and the bath is reblown to remove iron and chromium. The result is that iron and chromium are removed together in a slag high in titanium, aluminum and silicon, while a matte said to contain 60.8% Ni, 14.2% Co, 0.4% Cu and 24.5% S is derived after the blowing. The separate recovery of chromium or iron from the resulting slag is unlikely to be economically feasible.

Also worthy of mention in the present context is U.S. Pat. No. 3,313,601 (to O. F. Marvin) despite the fact that it does not relate to the treatment of scrap. The Marvin patent is concerned with the treatment of complex oxide ores, and describes an example wherein a chromite ore concentrate is heated to about 870° C. in the presence of CS gas whereby it is said to be converted to a mixture of chromium sulfide, iron sulfide and iron oxide. The cooled mass is subsequently leached to leave a residue of chromium sulfide. The outcome of attemping such a solid state sulfidation on alloy scrap is unknown, and the subsequent hydrometallurgical separation process would be much more complex in a multicomponent system.

The patent and general literature describing hydrometallurgical processes for the recovery of metals from solids in chloride solutions is extensive. The processes relate to recovery of metals, including substantially all the base metals, from a wide variety of matte sulphide concentrates and ores using different combinations of many leaching reagents including chlorine, hydrochloric acid, hydrochlorous acid, sodium hypochlorite, ferric chloride, cupric chloride, manganic chloride, sodium chloride, calcium chloride and other alkaline and alkaline-earth metal chlorides.

Few references, however, relate to the use of chlorine and a redox couple, such as cuprous-cupric chloride, to leach mattes, sulphide concentrates and alloys, particularly those containing metals selected from the group nickel, copper, and precious metals.

In U.S. Pat. No. 2,186,293 a process is described for recovery of nickel from matte by leaching in a solution containing cupric chloride and sufficient nickel chloride that the cuprous chloride formed upon dissolution of nickel remains in solution. The leach solution and residue are separated, nickel and copper are recovered from solution by electrolysis, and cupric chloride is regenerated for further leaching by reacting the solution remaining from the electrolysis with the chlorine produced thereby and returning the liquor to the leaching circuit.

A process for chlorine leaching of metals from sulphide ores is described in U.S. Pat. No. 1,943,337. The process is similar to that outlined above, but in this case the chlorine is fed to the same vessel in which the ore is treated thereby regenerating the leaching agent, such as ferric chloride, as it is consumed. As in the previous patent, however, no reference is made to preferential leaching of one metal from the solids with respect to other metals therein. The object of the process is clearly to leach as much metal value as possible from solids and there is no teaching of the possibility or desirability of preferential (or selective) leaching.

U.S. Pat. Nos. 2,829,966 and 2,835,569 relate to methods for recovery of gold from arseniureted ores containing nickel, cobalt and iron. Ore is leached in a mixture of HCl and chlorine to dissolve all the base metals, and the progress of the leach is followed by continuous monitoring of the redox potential. After dissolution of all the metals except gold, the continued addition of chlorine to the leach slurry causes an abrupt rise in potential until gold starts to dissolve, after which sufficient additional chlorine is fed to the slurry to dissolve most of the gold.

The lack of reference in these patents to either an interest in or means for separating nickel and chromium is consistent with the general literature on the leaching of sulphides by chlorides and chlorine. In fact, in U.S.

Pat. No. 3,880,653 it is inferred that nickel could not be leached from chromium since chromium is less noble than nickel. In summary, the conclusion may be drawn that the prior art did not recognize that nickel can be selectively leached from chromium in the manner disclosed in the present invention.

OBJECT OF THE INVENTION

The present invention aims at providing a method by which the chromium in superalloy scrap can be separated, conveniently and inexpensively, from other constituents of the scrap.

SUMMARY OF THE INVENTION

According to the present invention, a process for separating chromium in superalloy scrap from other constituents thereof by sulfidizing the superalloy scrap in accordance with the method disclosed in a co-pending application, Ser. No. 108,192 filed Dec. 27, 1979, by F. J. Hennion et al, entitled "Method For Recovering Chromium From Ni-Fe-Co Alloy Scrap" now U.S. Pat. No. 4,259,296. The method involves melting a scrap metal charge with sulfur or a metal sulfide such as nickel, cobalt and/or copper sulfides in an amount to insure sulfidation of all the chromium. Generally, at least twice the sulfur stoichiometrically required to combine with the chromium will be needed since it appears that nickel and cobalt sulfides form at about the same rate as does chromium sulfide, at least in the initial stages of sulfidation. Usually, about 20% to about 30% of sulfur in the matte will be sufficient to insure sulfidation of the chromium content and good grindability. Thus, a matte is formed which contains chromium with at least one metal selected from the group consisting of nickel, cobalt, molybdenum, iron and copper and may contain lesser amounts of other metals. The method comprises:

(i) sulfidizing superalloy as described to form a matte. Cooling the matte in desired manner and converting to particulate form by granulation in water, grinding (either with or without slow cooling to form separate fractions);

(ii) slurrying the matte particles in an agitated aqueous solution at a temperature of at least 70° C. and up to just below the boiling point and preferably at a range of about 85° C. to 105° C.;

(iii) selectively leaching said matte particles in said aqueous media containing a redox couple such as the cuprous-cupric couple (or couples of iron, manganese, etc.) while bubbling chlorine into the slurry at a rate controlled by redox potential wherein said redox potential is maintained at a value below 600 mV, e.g., in the range of about 250 to 500 mV and preferably about 400 mV, to dissolve nickel, cobalt, molybdenum and metals other than chromium as chlorides and retaining most of the chromium in the undissolved sulfide form;

(iv) separating the undissolved solids containing chromium from the solution and treating the solids for recovery of chromium; these solids may be roasted with oxygen and the remelted chromium oxide reduced to yield metallic chromium by melting with aluminum;

(v) treating the solution for copper and iron removal; and (vi) recovering the nickel and cobalt from solution by conventional means.

In the process of the present invention as described above in (i), the sulfidized matte can be treated directly or slow-cooled, physically separated and the separated fractions treated. When the matte is treated directly, the molten matte may be granulated by pouring into an aqueous medium and subjecting the granules to aqueous chlorine leaching. Alternatively, the matte can be cast, cooled and ground prior to leaching. When the matte is slow-cooled, crystals of chromium sulfide phase are formed and these crystals may be physically separated from the other metal sulfide phases in the matte by magnetic separation or flotation. After separating the two matte portions, both are subjected to the aqueous chlorine leaching medium since the physical separation does not achieve sufficiently effective separation of all the chromium sulfide from the other metal sulfides.

Metallographic analysis has shown that the chromium is one of the first elements to be sulfided, and it is the behavior of the chromium sulfide prepared as described above in the co-pending F. J. Hennion et al application, under controlled conditions that apparently permits the selective leaching to separate chromium from accompanying metals to be accomplished. It is essential, therefore, that the sulfiding steps be carried out prior to the controlled leaching.

It is also essential to the process of the present invention that the redox potential during leaching be maintained below 600 mV and preferably in the range of about 250 mV to 550 mV. We have discovered that when the redox potential is not maintained below the specified range of the present invention, a major portion of the chromium that was in the matte is found in the solution and extracted along with the other metals, i.e., the leach is non-selective.

A further step that is essential to the present invention is the agitation of the aqueous mixture or slurry at an elevated temperature during leaching. We have found that it is essential to the process of the present invention that the agitation take place at a temperature in the range of 70° C. up to just below the boiling point of the aqueous solution. The preferred range is between about 85° C. and 105° C. to facilitate effective and rapid recovery of metal values.

The recovery of the chromium metal that is present in the mattes that are utilized in the process of the present invention is accomplished by known methods as described above after the complete leaching operation has taken place.

Some examples of the process will be described.

EXAMPLE I

Superalloy matte feed was prepared as described above and analyzed as follows:

| Ni | Cr | Co | Fe | Mo | S |
|---|---|---|---|---|---|
| 58.1% | 8% | 3.1% | 5.2% | .38% | 22.5% |

The matte was ground to pass 48 mesh and slurried with an aqueous solution containing 80 grams/liter nickel and 10 grams/liter copper in an initial solids concentration of 144 grams/liter.

Chlorine gas was bubbled through the slurry for 3 hours at a temperature range of between 80° and 95° C. and at a chlorine feed rate which provided a redox potential of about 550 mV to selectively dissolve the non-chromium sulfides.

Extractions of metal values into the leach solution was as follows:

| Ni | Cr | Co | Fe | Mo |
|---|---|---|---|---|
| 88% | 13.4% | 72.7% | 74.1% | 57% |

It will be appreciated by those skilled in the art that a return aqueous stream containing nickel chloride would be used in the leaching, and a solution containing 80 g/l Ni was used for all leach tests, and 10 g/l Cu was also included in the solution to establish the cuprous-cupric couple.

After carrying out a leach, a typical treatment route for the solution would be to remove the copper by cementation on fresh matte, hydrolyse the iron, molybdenum and chromium with a base such as nickel carbonate, extract cobalt by ion exchange or solvent extraction, and electrowin nickel. The copper-containing residue would revert to the chlorine leach and the iron-molybdenum-chromium cake may be used directly as a steel making additive or processed further to recover chromium and molybdenum. Cobalt extracted by ion exchange or solvent extraction could be removed from solutions produced by stripping the resin or solvent. The chromium containing residue from the leach could be roasted in the presence of oxygen to remove sulfur, and the chromium oxide reduced to yield chromium by smelting with aluminum.

EXAMPLE II

A solution identical to that prepared above in Example I was prepared and leached in the same manner as described in Example I except that the redox potential was uncontrolled and allowed to reach a potential of >900 mV. The leaching was completed with the following extractions of metals into the leach solution:

| Ni | Cr | Co | Fe | Mo |
|---|---|---|---|---|
| 99.3% | 70.4% | 93.4% | 92.2% | 86.1% |

It can easily be seen that when the redox potential was uncontrolled, chlorine leaching of the sulfides was non-selective.

EXAMPLE III

Matte produced by sulfidizing superalloy scrap was slowly cooled from the molten state, ground and subjected to flotation and magnetic separation. The resulting separated solids were analyzed and found to have the following composition:

| Ni | Cr | Co | Fe | Mo |
|---|---|---|---|---|
| 38.3% | 18.4% | 2.1% | 2.8% | 2.3% |

The solids were ground to pass 48 mesh and mixed with an aqueous solution to initial solids concentration of 120 grams/liter.

Chlorine gas was bubbled through the solution for 3 hours at a temperature in the range of between 80° and 95° C. and at a rate to provide a redox potential maintained at about 550 mV.

Leaching was completed and extraction of metals in the leach solution was as follows:

| | Ni | Cr | Co | Fe | Mo |
|---|---|---|---|---|---|
| Extraction % | 60 | 9.3 | 24.3 | 15.5 | 33 |
| Residue Analysis % | 20 | 21.7 | 1.9 | 1.7 | 2.1 |

It can be seen that the Ni:Cr ratio in the feed was about 2:1 whereas the ratio in the solids after leaching was about 1:1.

EXAMPLE IV

A feed identical to that prepared above in Example III was prepared and leached in the same manner as described in Example III except that the redox potential was uncontrolled and allowed to reach a potential of >900 mV. When leaching was completed the following recovery figures were obtained:

| | Ni | Cr | Co | Fe | Mo |
|---|---|---|---|---|---|
| Leach Extraction % | 96 | 71.2 | 78.6 | 89 | 93 |
| Residue Analysis % | 7.7 | 27.9 | 1.7 | 1.7 | 1 |

It can easily be seen that by allowing the redox potential to rise uncontrolled the selective non-leaching of chromium was not accomplished.

EXAMPLE V

Further tests made in leaching the feed matte of Example I at 100° C., a copper concentration of 10 grams/liter and with chlorine bubbling controlled to give redox potentials of 400 mV and 700 mV for 2 hours, respectively, gave the following results:

| Redox | 400 mV | Ni ext. = 97.8% |
| | | Cr ext. = 4.6% |
| Redox | 700 mV | Ni ext. = 97.5% |
| | | Cr ext. = 49.7% |

It will be understood that various modifications and additions may be made to the details of the embodiments of the invention described herein without departing from the scope of the invention which is defined by the appended claims.

We claim:
1. In a process for separating chromium from other metals in superalloy scrap consisting essentially of chromium alloyed with at least one other metal selected from the group consisting of nickel, cobalt and iron, said scrap being sulfidized with a sulfidizing agent selected from the group consisting of elemental sulfur, nickel sulfide, cobalt sulfide, copper sulfide and mixtures thereof, and melting to form a sulfidized matte, the improvement comprising:
(i) forming said matte into solid fragments,
(ii) subjecting said fragments to an aqueous leaching medium,
(iii) feeding chlorine into said aqueous leaching medium in the presence of a redox couple with agitation at an elevated temperature, said chlorine being fed at a rate to maintain the redox potential below about 600 mV,

(iv) recovering the undissolved sulfidized chromium from said leach medium,
(v) recovering chromium metal from said undissolved sulfidized chromium, and
(vi) recovering the dissolved nickel, cobalt or iron from said leach medium.

2. A process according to claim 1 wherein said redox coupled is a cuprous-cupric redox couple.

3. A process in accordance with claim 1 wherein said steps of fragmenting comprises comminution to particles not greater than about 500 microns in diameter.

4. A process in accordance with claim 1 wherein said elevated temperature is in the range of about 70° C. to just below the boiling point of said aqueous leaching medium.

5. A process in accordance with claim 4 wherein said elevated temperature is in the range of about 85° C. and 105° C.

6. A process in accordance with claim 5 wherein the redox potential is controlled to remain in the range of about 250 mV and 550 mV.

7. A process in accordance with claim 5 wherein the redox potential is controlled at about 400 mV and the copper content of the leach solution is about 10 grams/liter.

8. A process according to claim 1 wherein said molten matte is granulated by pouring a stream of matte into water.

9. A process according to claim 1 wherein the molten matte is solidified and then ground to fragments.

10. A process according to claim 1 wherein the molten matte is slowly cooled at a rate effective to produce chromium sulfide crystals in the solidified matte, and the matte is leached with or without physical separation of individual phases therein.

* * * * *